(12) United States Patent
Shen et al.

(10) Patent No.: US 12,540,924 B2
(45) Date of Patent: Feb. 3, 2026

(54) MAGNETOSTRICTIVE GUIDED WAVE SENSOR AND METHOD FOR PREPARING MAGNETOSTRICTIVE COATING

(71) Applicant: China Special Equipment Inspection and Research Institute, Beijing (CN)

(72) Inventors: Gongtian Shen, Beijing (CN); Qingli Qi, Beijing (CN); Yang Zheng, Beijing (CN); Yilin Yuan, Beijing (CN); Qingchuan Pan, Beijing (CN); Zongjian Zhang, Beijing (CN)

(73) Assignee: CHINA SPECIAL EQUIPMENT INSPECTION AND RESEARCH INSTITUTE, Beijing (CN)

( * ) Notice: Subject to any disclaimer, the term of this patent is extended or adjusted under 35 U.S.C. 154(b) by 434 days.

(21) Appl. No.: 18/095,379

(22) Filed: Jan. 10, 2023

(65) Prior Publication Data
US 2023/0251229 A1 Aug. 10, 2023

(30) Foreign Application Priority Data
Feb. 7, 2022 (CN) .......................... 202210115831.8

(51) Int. Cl.
G01N 29/24 (2006.01)
C23C 4/123 (2016.01)
G01N 29/04 (2006.01)

(52) U.S. Cl.
CPC ......... *G01N 29/2412* (2013.01); *C23C 4/123* (2016.01); *G01N 29/04* (2013.01);
(Continued)

(58) Field of Classification Search
CPC ....... C23C 24/04; C23C 24/08; C23C 24/082; C23C 24/087; C23C 24/10; C23C 24/106;
(Continued)

(56) References Cited

U.S. PATENT DOCUMENTS

| 4,485,834 A * | 12/1984 | Grant ...................... C03B 19/01 425/7 |
| 6,465,039 B1 * | 10/2002 | Pinkerton ............... C23C 24/04 427/427 |

(Continued)

FOREIGN PATENT DOCUMENTS

| CN | 102608207 A | 7/2012 |
| CN | 104122327 A | 10/2014 |

(Continued)

OTHER PUBLICATIONS

The First Office Action and search report issued on Nov. 30, 2023 for counterpart Chinese Patent Application No. 202210115831.8, along with machine EN translation downloaded from EPO, 10 pages.

(Continued)

Primary Examiner — Kristina M Deherrera
Assistant Examiner — Gedeon M Kidanu
(74) Attorney, Agent, or Firm — LOZA & LOZA, LLP; Michael Fedrick

(57) ABSTRACT

The present disclosure provides a magnetostrictive guided wave sensor and a method for preparing magnetostrictive coating, relating to the field of magnetic functional materials and preparations thereof. The method includes: pretreating a surface of a test piece; and spraying magnetostrictive alloy powder on the pretreated surface of the test piece to form a magnetostrictive coating attached to the pretreated surface. In the magnetostrictive guided wave sensor and the method for preparing magnetostrictive coating according to the embodiments of the present disclosure, by spraying the magnetostrictive coating on the test piece, no coupling agent is required between the probe of the magnetostrictive coating sensor and the test piece, and the magnetostrictive coating can be formed on test pieces of any shape. In addition, the coating has a high bonding strength with the test piece, and has good tissue characteristics and magnetostrictive performance.

8 Claims, 3 Drawing Sheets

--- pretreating a surface of a test piece — S101 spraying magnetostrictive alloy powder on the pretreated surface of the test piece to form a magnetostrictive coating attached to the pretreated surface, wherein the magnetostrictive alloy powder comprises at least one selected from the group of: $Fe_{100-x-y}Al_xM_y$ (x = 11 to 24), $Fe_{100-x-y}Ga_xM_y$ (x = 14 to 28), and $Fe_{100-x-y}Ni_xM_y$ (x=27 to 58), where y is equal to 0.01 to 1.0, x and y are atomic fractions, and M is one or more selected from the group of B, Co, Cr, Si, Y, Ti, V, Ge, Be, Ga, Mn, Zn, Nb, Ta, W, and Al — S102

(52) U.S. Cl.
CPC ............... *G01N 2291/023* (2013.01); *G01N 2291/0289* (2013.01)

(58) Field of Classification Search
CPC .. C23C 4/06; C23C 4/08; C23C 4/123; C23C 4/129; G01N 2291/023; G01N 2291/0289; G01N 2291/0425; G01N 29/04; G01N 29/043; G01N 29/2412
See application file for complete search history.

(56) References Cited

U.S. PATENT DOCUMENTS

| | | | | |
|---|---|---|---|---|
| 8,308,874 | B1* | 11/2012 | Clark | .............. H01F 1/047 148/306 |
| 2004/0095137 | A1* | 5/2004 | Kwun | .............. G01N 29/2412 324/240 |

FOREIGN PATENT DOCUMENTS

| | | |
|---|---|---|
| CN | 105252011 A | 1/2016 |
| CN | 110530978 A | 12/2019 |
| JP | 08210931 A | 8/1996 |

OTHER PUBLICATIONS

The Second Office Action issued on May 15, 2024 for counterpart Chinese Patent Application No. 202210115831.8, along with machine EN translation downloaded from EPO, 10 pages.

Decision of Rejection issued on Jul. 25, 2024 for counterpart Chinese Patent Application No. 202210115831.8, along with EN translation, 5 pages.

* cited by examiner

MAGNETOSTRICTIVE GUIDED WAVE SENSOR AND METHOD FOR PREPARING MAGNETOSTRICTIVE COATING

CROSS-REFERENCE TO RELATED APPLICATIONS

This application claims the benefit of priority to Chinese Patent Application No. 202210115831.8, filed on Feb. 7, 2022, which is hereby incorporated by reference in its entirety.

TECHNICAL FIELD

The present disclosure relates to the field of magnetic functional materials and preparations thereof, and particularly to a magnetostrictive guided wave sensor and a method for preparing magnetostrictive coating.

BACKGROUND

With the scientific and technological progress and the social development, regular and effective monitoring, detections and evaluations of industrial devices and components have become an indispensable link in the process of structural manufacturing and maintenance. Through monitoring and detecting, a device can be kept in a best running state as far as possible, thus ensuring lives and properties of the staff, increasing the production efficiency, improving the product quality and prolonging the service life of the device. At present, the conventional ultrasonic detection technology is to excite a mechanical vibration in an object to generate elastic guided waves, thus detecting whether there are defects such as corrosion, crack and damage in a ferromagnetic member, and it is especially suitable for the regular detection and the online monitoring of high-temperature, high-pressure and inaccessible pipes and pressure vessels. At present, there are mainly three types of conventional electromagnetic ultrasonic sensors: a piezoelectric sensor, an electromagnetic ultrasonic sensor and a magnetostrictive sensor. A coupling agent is required between a monitoring probe of the piezoelectric sensor and an object to be detected, and a surface of the object to be detected usually needs to be pretreated to obtain a good coupling state when the probe contacts the object to be detected, so the piezoelectric ultrasonic detection technology is difficult to meet the requirements. The electromagnetic ultrasonic sensor is a non-contact sensor that generates vibration waves on a surface of a workpiece by a Lorentz force of high-frequency eddy current, but it has the problems of a low energy conversion efficiency and an insufficient signal-to-noise ratio for the detection of austenitic stainless steel and non-ferromagnetic materials. The magnetostrictive sensor has a large detection range, realizes a non-contact detection, and is suitable for working in a harsh environment such as high-temperature and corrosion. Although the magnetostrictive sensor has a lower energy conversion efficiency than the piezoelectric sensor, its high detection accuracy can still meet most of the detection needs.

Compared with other traditional nondestructive detection methods, magnetostrictive ultrasonic guided wave detection is suitable for detections under high-temperature, low-temperature, dry or vacuum condition because of its unique technical advantages such as non-contact, no need of coupling agent, long distance and quick detection, thus having broad application prospects in the fields of iron and steel, electric power, petroleum, transportation and so on. There are two main energy conversion mechanisms for the electromagnetic acoustic technology, i.e., one mechanism is based on the Lorentz force and mainly used for the non-ferromagnetic materials, and the other mechanism is based on the magnetostriction and mainly used for the ferromagnetic materials. The magnetostrictive guided wave detection was proposed as early as 1917, but its potential in the nondestructive detection was not discovered until 1964. The magnetostrictive ultrasonic guided wave detection initially uses the magnetostrictive effect of a ferromagnetic material itself to wind a coil outside the ferromagnetic material, and when an AC excitation signal is transmitted by the coil, an alternating magnetic field is induced in the ferromagnetic material, and ultrasonic guided waves are generated in the member. However, the magnetostrictive effect of the ferromagnetic material is weak, which leads to a serious attenuation of the guided waves and a low flaw detection sensitivity. Next, the researchers stick a magnetostrictive strip on a test piece, so that ultrasonic guided waves are generated in the magnetostrictive strip, coupled into a pipe wall through epoxy resin and propagated bidirectionally along the pipe wall to detect the crack defects and corrosions, the principle of which is mainly to increase the change of a magnetization state of the magnetostrictive material under an external magnetic field, so as to improve the flaw detection sensitivity of the guided waves.

There are three problems in a nondestructive detection by sticking a magnetostrictive strip on a test piece. First of all, the adhesive for bonding, such as epoxy resin, is a polymer chemical product, which will be aged or even ineffective when used in a harsh environment for a long time, resulting in high cost when using the magnetostrictive strip guided wave detection for online monitoring. Secondly, for the detection of some complex structural parts, such as railway tracks, cable-stayed bridges, steel wire locks and so on, it is difficult for the magnetostrictive strip to fit well with the test piece.

SUMMARY

Aiming at the problems in the prior art, the embodiments of the present disclosure provide a magnetostrictive guided wave sensor and a method for preparing magnetostrictive coating, which can at least partially solve the problems in the prior art.

In an aspect, the present disclosure proposes a method for preparing magnetostrictive coating, including:
pretreating a surface of a test piece; and
spraying magnetostrictive alloy powder on the pretreated surface of the test piece to form a magnetostrictive coating attached to the pretreated surface, wherein the magnetostrictive alloy powder includes at least one selected from the group of: $Fe_{100-x-y}Al_xM_y$ (x=11 to 24), $Fe_{100-x-y}Ga_xM_y$ (x=14 to 28), and $Fe_{100-x-y}Ni_xM_y$ (x=27 to 58), where y=0.01 to 1.0, x and y are atomic fractions, and M is one or more selected from the group of B, Co, Cr, Si, Y, Ti, V, Ge, Be, Ga, Mn, Zn, Nb, Ta, W, and Al.

Optionally, the magnetostrictive alloy powder is prepared by a gas atomization method in advance.

Optionally, the test piece is a tubular test piece, a plate test piece, or a special-shaped test piece.

In another aspect, the present disclosure proposes magnetostrictive guided wave sensor, wherein a probe of the magnetostrictive guided wave sensor is a magnetostrictive coating prepared by the method for preparing magnetostrictive coating according to any of the above embodiments.

Optionally, the magnetostrictive guided wave sensor further includes a shell and a transducer disposed in the shell.

Optionally, the transducer includes a magnet, an exciting coil, and a receiving coil, with the exciting coil and the receiving coil being disposed close to the magnetostrictive coating.

Optionally, the shell is further provided with a signal transmission interface for connection with an external detection instrument, and the signal transmission interface is coupled to the exciting coil and the receiving coil.

In the magnetostrictive guided wave sensor and the method for preparing magnetostrictive coating according to the embodiments of the present disclosure, by spraying the magnetostrictive coating on the test piece, a magnetostrictive coating sensor can be developed and a magnetostrictive coating ultrasonic guided wave monitoring method can be established, so that no coupling agent is required between the probe of the magnetostrictive coating sensor and the test piece, and the magnetostrictive coating can be formed on test pieces of any shape. In addition, the coating has a high bonding strength with the test piece, and has good tissue characteristics and magnetostrictive performance, thus realizing the application of high energy conversion efficiency and high signal-to-noise ratio in the ultrasonic guided wave detection. The established magnetostrictive coating ultrasonic guided wave monitoring technology, instead of the existing magnetostrictive sensor, can be adopted for the electromagnetic ultrasonic guided wave detection, and can realize the online monitoring in a high-temperature, low-temperature or dry environment and the like.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts. In the drawings.

DETAILED DESCRIPTION

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure. It should be noted that the embodiments in the present disclosure and the features in the embodiments can be arbitrarily combined with each other without conflict.

Figure 1:
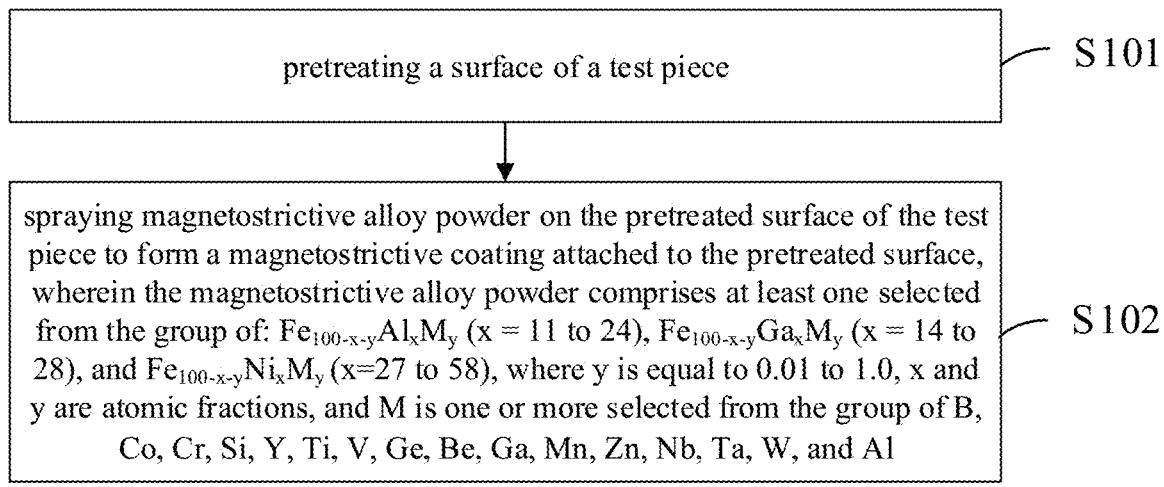
FIG. 1 is a flowchart of a method for preparing magnetostrictive coating according to an embodiment of the present disclosure.

FIG. 1 is a flowchart of a method for preparing magnetostrictive coating according to an embodiment of the present disclosure. As illustrated in FIG. 1, a method for preparing magnetostrictive coating according to an embodiment of the present disclosure includes:

S101: pretreating a surface of a test piece.

In this step, when the test piece is made of a metal material, pretreating the surface of the test piece may specifically include removing a scale on the surface of the test piece; and when the test piece is made of any other material, pretreating the surface of the test piece may specifically include cleaning and removing dirt and burrs on the surface of the test piece. After the surface of the test piece is pretreated, magnetostrictive alloy powder can be better attached to the test piece to form the magnetostrictive coating.

S102: spraying magnetostrictive alloy powder on the pretreated surface of the test piece to form a magnetostrictive coating attached to the pretreated surface, wherein the magnetostrictive alloy powder includes at least one selected from the group of: $Fe_{100-x-y}Al_xM_y$ (x=11 to 24), $Fe_{100-x-y}Ga_xM_y$ (x=14 to 28), and $Fe_{100-x-y}Ni_xM_y$ (x=27 to 58), where y is equal to 0.01 to 1.0, x and y are atomic fractions, and M is one or more selected from the group of B, Co, Cr, Si, Y, Ti, V, Ge, Be, Ga, Mn, Zn, Nb, Ta, W, and Al.

In this step, the magnetostrictive alloy powder may be sprayed on the pretreated surface of the test piece by using a spraying technology, which may be a hot spraying technology or a cold spraying technology. The hot spraying technology uses a heat source to heat a spraying material to a molten or semi-molten state, and sprays and deposits the spraying material on a surface of a substrate at a certain speed to form a coating. The cold spraying technology sprays coating powder onto a substrate by a supersonic gas-solid two-phase gas flow at a room temperature or a low temperature to form a dense coating. Therefore, there is no high-temperature heating of the coating material powder particles in the cold spraying technology, so there will not occur the effect that the coating performance is affected by high-temperature oxidation, gasification, melting, crystallization, and the like.

The magnetostrictive alloy powder with the above element contents influences the alloy phase structure, so that the magnetostrictive coating made of the magnetostrictive alloy powder has excellent guided wave performance and flaw detection sensitivity. For example, the magnetostrictive alloy powder may be $Fe_{73.15}Ga_{26.84}(NbC)_{0.01}$.

In the method for preparing magnetostrictive coating according to the embodiment of the present disclosure, by spraying the magnetostrictive coating on the test piece, a magnetostrictive coating sensor can be developed and a magnetostrictive coating ultrasonic guided wave monitoring method can be established, so that no coupling agent is required between the probe of the magnetostrictive coating sensor and the test piece, and the magnetostrictive coating can be formed on test pieces of any shape. In addition, the coating has a high bonding strength with the test piece, and has good tissue characteristics and magnetostrictive performance, thus realizing the application of high energy conversion efficiency and high signal-to-noise ratio in the ultrasonic guided wave detection. The established magnetostrictive coating ultrasonic guided wave monitoring technology, instead of the existing magnetostrictive sensor, can be adopted for the electromagnetic ultrasonic guided wave detection, and can realize the online monitoring in a high-temperature, low-temperature or dry environment and the like.

Optionally, the magnetostrictive alloy powder is prepared in a gas atomization method in advance.

In this embodiment, the gas atomization method means that liquid metal or alloy is directly crushed into fine droplets under an external force, and then rapidly condensed to obtain powder. Compared with a mechanical pulverization method, the gas atomization method is a simpler and more economical method for powder production.

Optionally, the test pieces include polymer material test pieces, metal material test pieces and nonmetal material test pieces.

In this embodiment, the nonmetal material refers to a material with nonmetal properties (poor electrical conductivity and thermal conductivity), including glass, ceramics, graphite and rock with inorganic substances as main bodies, and wood, plastics and rubber with organic substances as main bodies. The nonmetal material, like the metal material and the organic polymer material, is also an important part of the contemporary complete material system.

Optionally, the test piece is a tubular test piece, a plate test piece or a special-shaped test piece. For example, the special-shaped test piece may be a test piece with a curved surface structure, a railway track, a cable-stayed bridge, and the like. In this embodiment, as being formed on the test piece by the spraying technology, the magnetostrictive coating is adaptive to the complex shape of the test piece, thus overcoming the defect that it is difficult to combine the magnetostrictive strip with the test piece of a complex structure.

Figure 2:
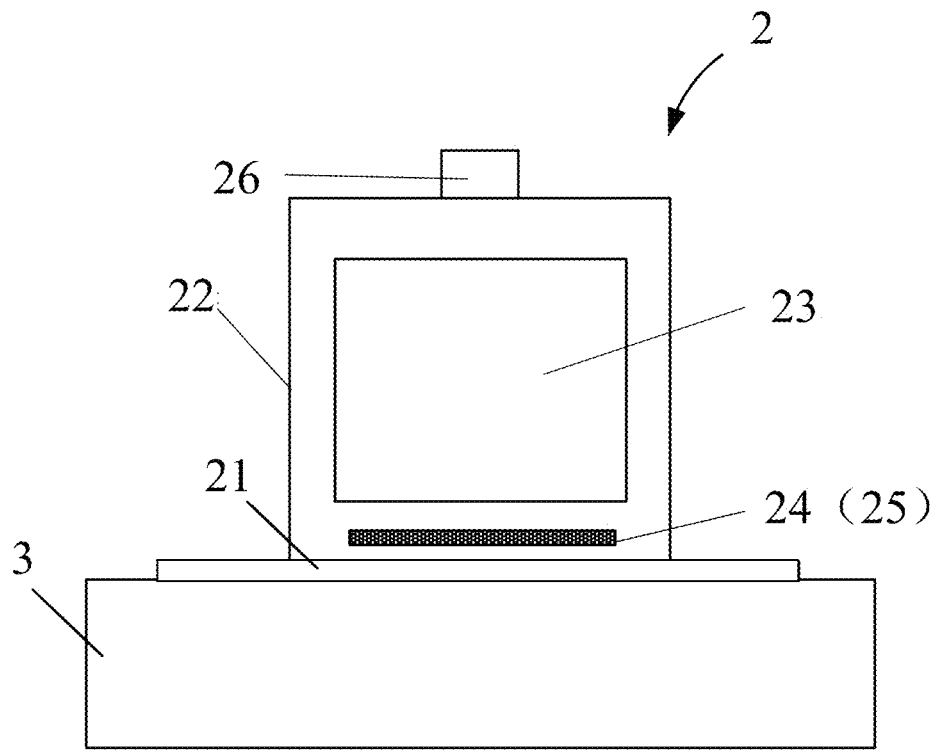
FIG. 2 is a schematic structural diagram of a magnetostrictive guided wave sensor according to an embodiment of the present disclosure.

In another aspect, the present disclosure proposes a magnetostrictive guided wave sensor, as illustrated in FIG. 2, and a probe of which is a magnetostrictive coating 21 prepared using the method for preparing magnetostrictive coating according to any of the above embodiments.

In this embodiment, by spraying a magnetostrictive coating 21 on a test piece 3, a magnetostrictive coating sensor 2 can be developed and a magnetostrictive coating ultrasonic guided wave monitoring method can be established, so that no coupling agent is required between the probe of the magnetostrictive coating sensor and the test piece, and the magnetostrictive coating can be formed on test pieces of any shape. In addition, the coating has a high bonding strength with the test piece, and has good tissue characteristics and magnetostrictive performance, thus realizing the application of high energy conversion efficiency and high signal-to-noise ratio in the ultrasonic guided wave detection. The established magnetostrictive coating ultrasonic guided wave monitoring technology, instead of the existing magnetostrictive sensor, can be adopted for the electromagnetic ultrasonic guided wave detection, and can realize the online monitoring in a high-temperature, low-temperature or dry environment and the like.

As illustrated in FIG. 2, optionally, the magnetostrictive guided wave sensor 2 further includes a shell 22 and a transducer disposed in the shell. In this embodiment, the shell 22 is configured to encapsulate and protect the transducer, and the transducer is configured to perform a mutual conversion between electrical energy and acoustic energy.

As illustrated in FIG. 2, optionally, the transducer includes a magnet 23, an exciting coil 24 and a receiving coil 25, wherein the exciting coil 24 and the receiving coil 25 are disposed close to the magnetostrictive coating 21.

In this embodiment, the magnet 23, the coils 24, 25 and other key functional components are disposed inside the encapsulation shell 22. The exciting coil 24 and the receiving coil 25 are disposed around the coating 21. The magnet 23 is configured to generate a bias magnetic field, and the exciting coil 24 is configured to generate an alternating magnetic field. Under the combined action of the bias magnetic field and the alternating magnetic field, the magnetostrictive coating 21 generates a strictive strain, which causes a particle vibration, and the vibration is transmitted in the form of waves to form ultrasonic guided waves. A signal is reflected back when the wave encounters a defect during propagation, and the signal is picked up by the receiving coil 25 to reflect a non-destructive detection result in the form of an electrical signal.

As illustrated in FIG. 2, optionally, the shell 22 is further provided with a signal transmission interface 26 for connection with an external detection instrument, and the signal transmission interface 26 is coupled to the exciting coil 24 and the receiving coil 25.

In this embodiment, the signal transmission interface 26 is disposed on the shell 22, and configured to be in connection with the internal coils 24, 25 through wires. The signal transmission interface 26 is the external interface of the transducer, and is coupled to the relevant interface of the external detection instrument through a signal transmission line to realize the reception of excitation and the transmission of electrical signals.

According to the detection requirement, the exciting coil and the application direction of the bias magnetic field determine the type of the magnetostrictive coating guided wave generated by the sensor. For example, the magnetostrictive coating guided wave may be a transverse wave, a longitudinal wave, a surface wave or an oblique incident wave.

As illustrated in FIG. 2, optionally, the magnetostrictive coating 21 is mechanically coupled to the surface of the test piece 3. In this embodiment, the magnetostrictive material is mechanically coupled to the surface of the test piece to be detected by spraying. Compared with the traditional magnetostrictive guided wave sensor, the coating guided wave sensor improves the detection sensitivity. Compared with the magnetostrictive strip sensor, the coating guided wave sensor requires no coupling agent, is less affected by external factors, and can be adopted for long-term online monitoring.

The magnetostrictive guided wave sensor and the method for preparing magnetostrictive coating according to the embodiment of the present disclosure have at least the following advantages.

1) The magnetostrictive coating has a good magnetostrictive performance and a good bonding with the substrate. Compared with the traditional magnetostrictive guided wave detection, the magnetostrictive coating guided wave detection requires no coupling agent when used to the ultrasonic guided wave detection, which can increase the energy conversion efficiency of the sensor and the signal-to-noise ratio of the detection, thus realizing the application of high energy conversion efficiency and high signal-to-noise ratio in the ultrasonic guided wave detection.

2) The magnetostrictive coating sensor can generate a longitudinal wave, a transverse wave, a surface wave, an oblique incident wave, a guided wave and an array wave, and can detect various types of defects. The magnetostrictive coating sensor, instead of the existing magnetostrictive sensor, can be adopted for the electromagnetic ultrasonic guided wave detection to improve the energy conversion efficiency, and realize the online monitoring.

The technical effects of the magnetostrictive guided wave sensor and the method for preparing magnetostrictive coating according to the present disclosure will be described below through specific embodiments.

Figure 3:
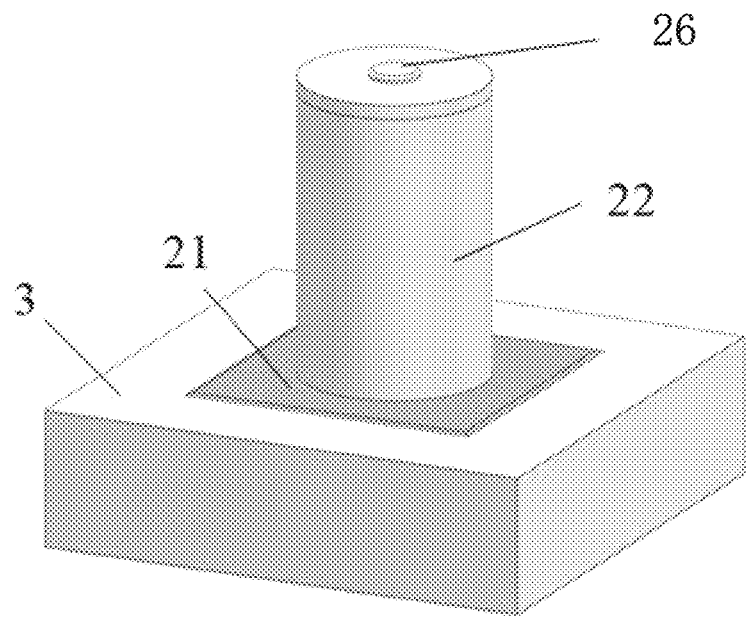
FIG. 3 is a schematic structural diagram of a magnetostrictive guided wave sensor and a test piece according to an embodiment of the present disclosure.

Embodiment 1 the magnetostrictive guided wave sensor according to the above embodiment is adopted to detect a planar object, and the transducer coil of the transducer is a rewinding coil, which excites the ultrasonic transverse wave. The magnetostrictive alloy powder is sprayed on the surface of the area to be detected of the detected object by a hot spraying to form a magnetostrictive coating, and the shell is used to encapsulate the whole structure of the transducer, as illustrated in FIG. 3.

The magnetostrictive coating is formed by spraying the magnetostrictive powder on the surface of the detected object by a supersonic flame spraying technology, and the coating area is greater than that of the transducer coil. The magnetostrictive powder consists of $Fe_{100-x-y}Al_xM_y$ (x=11 to 24), $Fe_{100-x-y}Ga_xM_y$ (x=14 to 28), and $Fe_{100-x-y}Ni_xM_y$ (x=27 to 58), where y is equal to 0.01 to 1.0, x and y are atomic fractions, and M is one or more selected from the group of B, Co, Cr, Si, Y, Ti, V, Ge, Be, Ga, Mn, Zn, Nb, Ta, W and Al, such as $Fe_{73.15}Ga_{26.84}(NbC)_{0.01}$.

Figure 4:
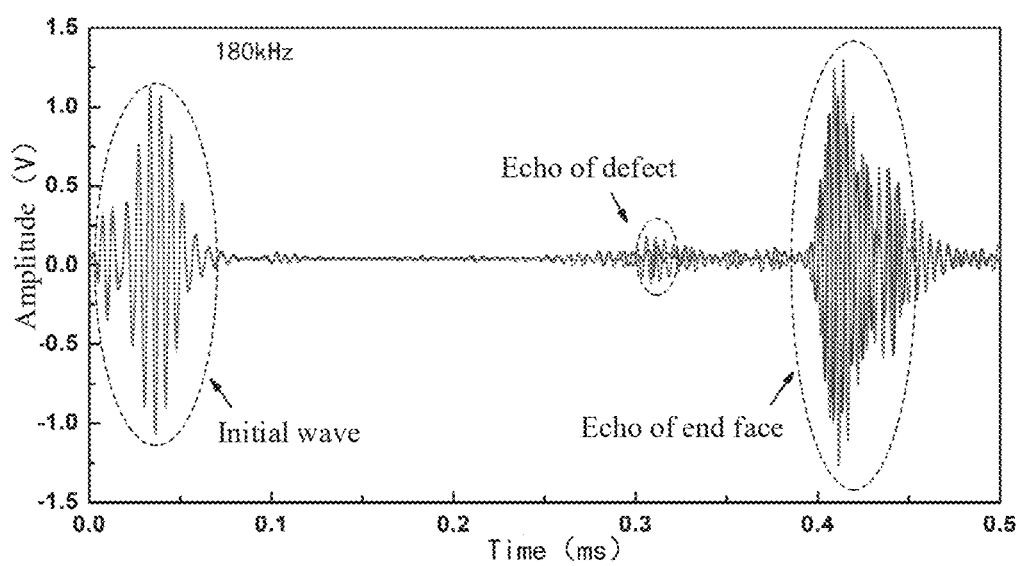
FIG. 4 is a schematic diagram of an echo signal of a transverse wave obtained through a detection of a test piece illustrated in FIG. 3 by the magnetostrictive guided wave sensor illustrated in FIG. 3.

The detected object is a steel plate with a length of 1 m, and a defect is artificially made at 0.75 m of the steel plate. The transverse wave is excited by the magnetostrictive guided wave sensor illustrated in FIG. 3, and the echo signals received from the defect and the end face of the steel plate are illustrated in FIG. 4. It is clear that when the guided wave generated by the magnetostrictive guided wave sensor propagates along the steel plate, signals are reflected back from the defect and the end face respectively, and a position determined according to wave velocity and time is consistent with a defect position, which indicates that the magnetostrictive guided wave sensor has a good effect in the guided wave detection.

Figure 5:
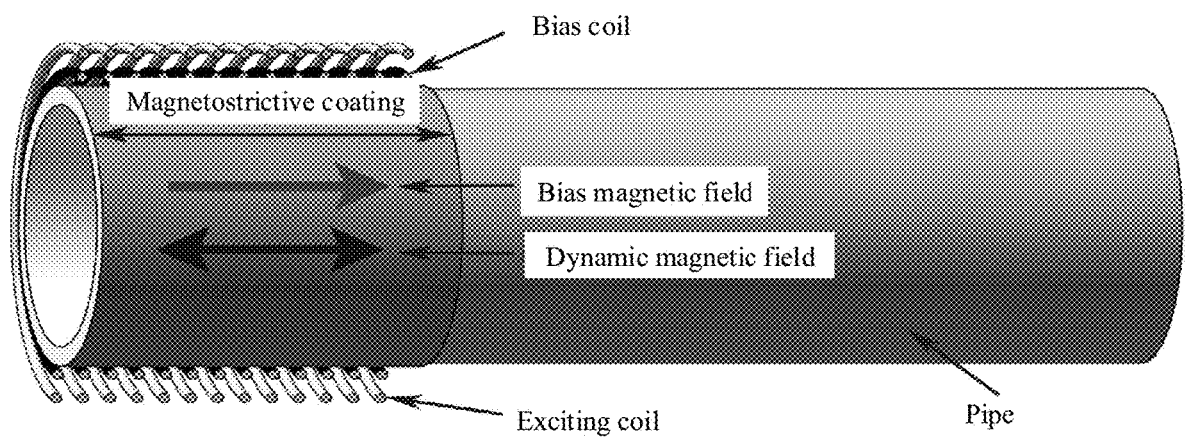
FIG. 5 is a schematic diagram of a positional relationship between a magnetostrictive coating and a coil of a magnetostrictive guided wave sensor and a test piece according to an embodiment of the present disclosure.

Embodiment 2 the magnetostrictive guided wave sensor according to the above embodiment is adopted to detect the pipe object. The transducer coil of the transducer is a coil wound along a circumferential direction of the pipe to excite an ultrasonic longitudinal wave. The magnetostrictive alloy powder is sprayed on the surface of the area to be detected of the detected object by a hot spraying to form a magnetostrictive coating, and the shell encapsulates the overall structure of the transducer, as illustrated in FIG. 5.

The magnetostrictive coating is formed by spraying the magnetostrictive powder on the surface of the detected object by a supersonic flame spraying technology, and the coating area is greater than that of the transducer coil. The magnetostrictive powder consists of $Fe_{100-x-y}Al_xM_y$ (x=11 to 24), $Fe_{100-x-y}Ga_xM_y$ (x=14 to 28), and $Fe_{100-x-y}Ni_xM_y$ (x=27 to 58), where y is equal to 0.01 to 1.0, x and y are atomic fractions, and M is one or more selected from the group of B, Co, Cr, Si, Y, Ti, V, Ge, Be, Ga, Mn, Zn, Nb, Ta, W and Al, such as $Fe_{80.75}Al_{19.24}(NbC)_{0.01}$.

Figure 6:
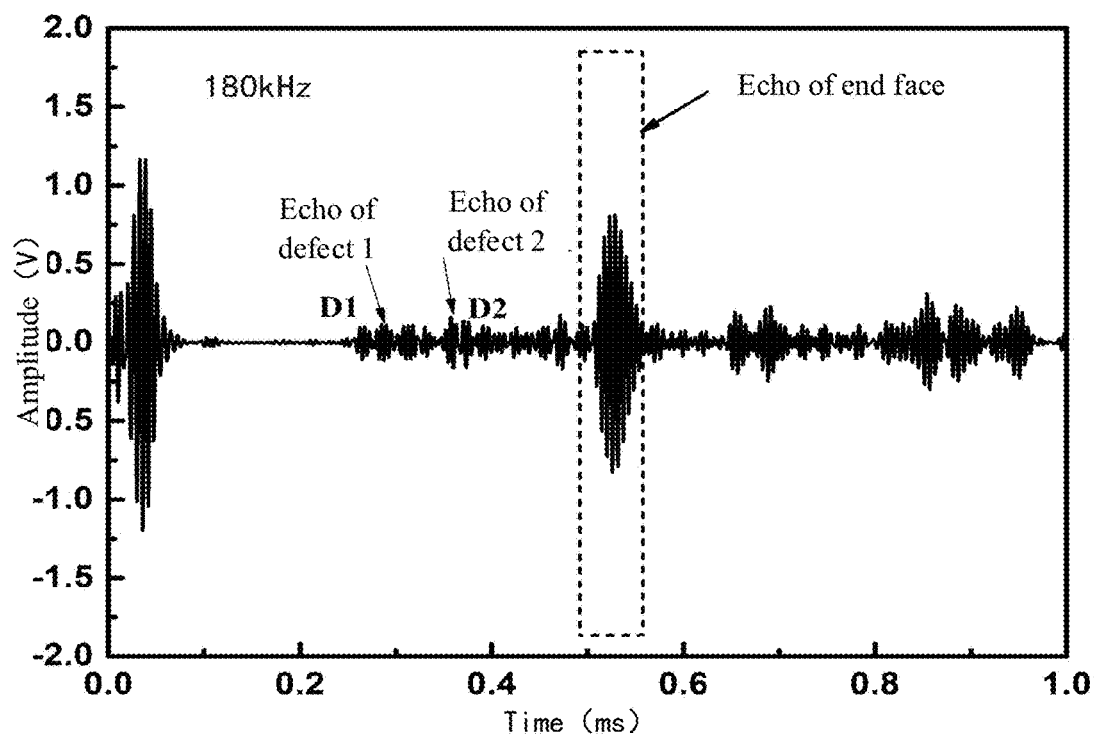
FIG. 6 is a schematic diagram of an echo signal of a longitudinal wave obtained through a detection of the test piece illustrated in FIG. 5 by the magnetostrictive guided wave sensor illustrated in FIG. 5.

The detected object is a pipe with a length of 1 m, and a defect is artificially made at 0.75 m of the pipe. A longitudinal wave is excited by the magnetostrictive coating transducer illustrated in FIG. 5, and echo signals received from the defect and an end face of the pipe are illustrated in FIG. 6. It is clear that when the guided wave generated by the magnetostrictive guided wave sensor propagates along the pipe, signals are reflected back from the defect and the end face respectively, and a position determined according to wave velocity and time is consistent with a defect position, which indicates that the coating guided wave sensor has a good effect in the guided wave detection.

According to the embodiments of the present disclosure, the magnetostrictive coating is disposed on the surface of the detected object, so that the energy conversion efficiency of the transducer can be effectively improved, and the problem that effective detection signals are difficult to be obtained in some metal materials can be solved. The magnetostrictive guided wave sensor is provided with the magnetostrictive coating by spraying, which can be applied to the online monitoring and detecting in complex extreme environments such as high temperature and low temperature, and especially has great advantages in the long-term online monitoring.

In the present disclosure, descriptions referring to the terms such as 'an embodiment', 'a specific embodiment', 'some embodiments', 'for example', 'an example', 'a specific example' or 'some examples' mean that the specific features, structures, materials or characteristics described in connection with the embodiment(s) or example(s), are included in at least one embodiment or example of the present disclosure. In the present disclosure, the schematic expressions of the above terms do not necessarily refer to a same embodiment or example. Further, the specific features, structures, materials or characteristics described may be combined in any one or more embodiments or examples in a suitable manner.

The purpose, technical features and technical effects of the present disclosure have been further described above by means of some embodiments. It should be understood that the embodiments are meant to facilitate understanding of the principles of the present disclosure, rather than limit the scope of the present disclosure. Any modifications, alternations, improvements, etc., made by those skilled in the art without departing from the concepts and principles of this disclosure shall fall within the scope of the present disclosure.

The invention claimed is:

1. A method for electromagnetic ultrasonic guided wave detection, comprising:
  pretreating a surface of an area to be detected of a detected object; and
  spraying, using a supersonic flame spraying technology, magnetostrictive alloy powder on the pretreated surface of the area to be detected to form a magnetostrictive coating attached to the pretreated surface of the area to be detected, so as to detect a defect on the area to be detected of the detected object, wherein the magnetostrictive alloy powder is $Fe_{73.15}Ga_{26.84}(NbC)_{0.01}$ or $Fe_{80.75}Al_{19.24}(NbC)_{0.01}$,
  wherein detecting the defect on the area to be detected of the detected object comprises:
  disposing a magnet, an exciting coil, and a receiving coil inside an encapsulation shell, and disposing the exciting coil and the receiving coil around the magnetorestrictive coating, wherein the magnet is configured to generate a bias magnetic field, and the exciting coil is configured to generate an alternating magnetic field, wherein under combined action of the bias magnetic field and the alternating magnetic field, the magnetostrictive coating generates a magnetostrictive strain which causes a particle vibration, and the vibration is transmitted in the form of waves to form ultrasonic guided waves, and wherein a signal is reflected back when the wave encounters the defect during propagation, and the signal is picked up by the receiving coil to reflect a non-destructive detection result in the form of an electrical signal.

2. The method according to claim 1, wherein the magnetostrictive alloy powder is prepared by a gas atomization method in advance.

3. The method according to claim 2, wherein the detected object is a tubular test piece, a plate test piece, or a special-shaped test piece.

4. The method according to claim 1, wherein the detected object is a tubular test piece, a plate test piece, or a special-shaped test piece.

5. The method according to claim 1, further comprising:
providing a signal transmission interface on the shell for connection with an external detection instrument; and
coupling the signal transmission interface to the exciting coil and the receiving coil.

6. The method according to claim 1, wherein:
the shell is used to encapsulate the whole structure of a transducer, and the transducer comprises a transducer coil; and
the step of spraying magnetostrictive alloy powder on the pretreated surface of the area to be detected to form a magnetostrictive coating comprises spraying magnetostrictive alloy powder on the pretreated surface of the area to be detected to form a magnetostrictive coating with an area greater than an area of each of the exciting coil and the receiving coil.

7. The method according to claim 1, wherein when the detected object is a pipe test piece, and the step of detecting the defect on the area to be detected of the detected object comprises:
disposing a bias coil around the magnetostrictive coating attached to an outer surface of the pipe test piece, and disposing the exciting coil around the bias coil, wherein the bias coil is configured to generate a bias magnetic field, and the exciting coil is configured to generate an alternating magnetic field.

8. The method according to claim 1, wherein when the detected object is a plate test piece, the step of disposing the magnet, the exciting coil, and the receiving coil inside the encapsulation shell, and disposing the exciting coil and the receiving coil around the magnetorestrictive coating comprises:
disposing the encapsulation shell containing the magnet, the exciting coil, and the receiving coil onto the magnetostrictive coating surface.

* * * * *